United States Patent

DiMarco

[11] Patent Number: 5,842,749
[45] Date of Patent: Dec. 1, 1998

[54] COVERED LUG RETENTION ASSEMBLY FOR WHEEL COVER

[75] Inventor: Robert J. DiMarco, Troy, Mich.

[73] Assignee: McKechnie Vehicle Components (USA), Inc., Troy, Mich.

[21] Appl. No.: 850,034

[22] Filed: May 2, 1997

[51] Int. Cl.$^6$ .................................................. B60B 7/14
[52] U.S. Cl. ................................ 301/37.37; 301/108.4
[58] Field of Search ........................... 301/37.1, 37.37, 301/37.42, 108.1, 108.4, 35.62; 411/371, 372, 373, 429, 431, 432

[56] References Cited

U.S. PATENT DOCUMENTS

| | | |
|---|---|---|
| 2,545,130 | 3/1951 | Ash . |
| 3,653,719 | 4/1972 | Osawa et al. . |
| 4,842,339 | 6/1989 | Roulinson . |
| 4,895,415 | 1/1990 | Stay et al. . |
| 4,968,202 | 11/1990 | Lanham .................................. 411/431 |
| 5,082,409 | 1/1992 | Bias ........................................ 411/431 |
| 5,180,266 | 1/1993 | Nolan et al. .......................... 301/35.62 |
| 5,181,767 | 1/1993 | Hudgins et al. . |
| 5,193,884 | 3/1993 | Sheu et al. ............................ 301/37.37 |
| 5,205,614 | 4/1993 | Wright .................................. 301/37.37 |
| 5,286,092 | 2/1994 | Maxwell, Jr. ......................... 301/37.37 |
| 5,380,070 | 1/1995 | FitzGerald ........................... 301/37.37 |
| 5,520,445 | 5/1996 | Toth ...................................... 301/37.37 |
| 5,667,281 | 9/1997 | Ladouceur ........................... 301/37.37 |
| 5,707,113 | 1/1998 | Russell ................................. 301/37.37 |

*Primary Examiner*—Russell D. Stormer
*Attorney, Agent, or Firm*—Bliss McGlynn, P.C.

[57] ABSTRACT

A wheel ornament assembly (10) includes a nut cap assembly (16) threadingly engaging an externally threaded lug (20) of a vehicle wheel (14). The nut cap assembly (16) retains a decorative wheel ornament (12) to the wheel (14). The nut cap assembly (16) includes an insert member (32) within and non-rotatably fixed to a cap cover (34) to provide desired aesthetics. The insert member (32) includes a threaded interior bore (35) with relief slots (44) therein to allow the walls of the insert member (32) to flex or expand after full threading of the nut cap assembly (16) on the lug nut (20) to prevent stripping of the threads. The cap cover (34) provides clearance to allow flexibility of the insert member (32) while maintaining its fixed connection.

30 Claims, 4 Drawing Sheets

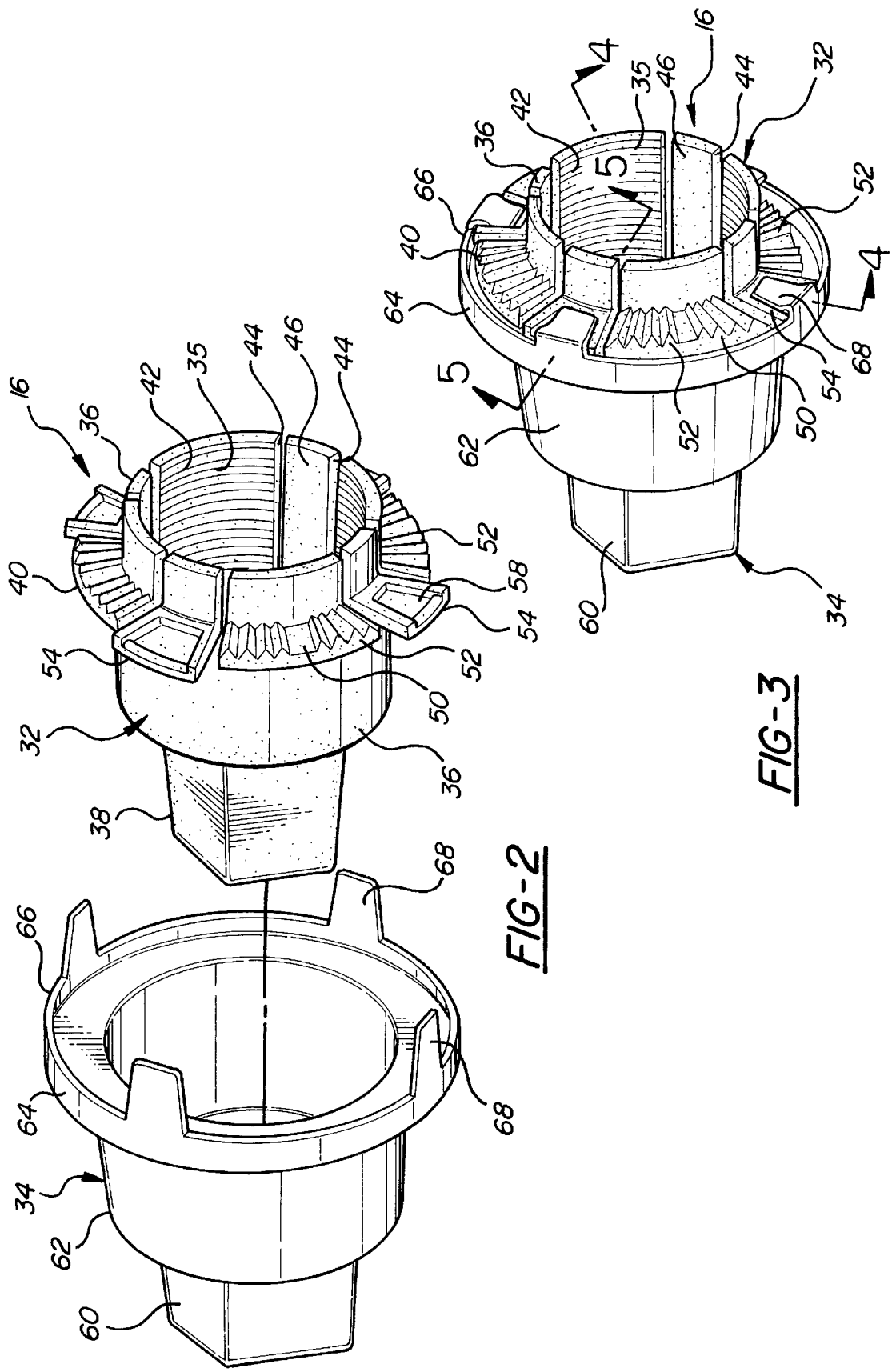

COVERED LUG RETENTION ASSEMBLY FOR WHEEL COVER

BACKGROUND OF THE INVENTION

1. Field of the Invention

This invention relates generally to a lug nut cap used on vehicle wheels. More specifically, the invention relates to decorative and functional lug nut cap which secure a wheel cover or hub to a vehicle wheel and which can bottom out and skip threads.

2. Description of the Related Art

Wheel covers and hubs have been known in the art to provide a decorative appearance to vehicle wheels. It is known to provide retention arrangements for wheel covers utilizing internally threaded lug caps that thread on externally threaded lug nuts of a vehicle wheel. In this manner, wheel covers or hubs may be mounted to a vehicle wheel following the mounting of the wheel itself to the vehicle.

An example of such an assembly is illustrated in U.S. Pat. No. 4,998,780 issued Mar. 12, 1991 in the name of Eshler et al. The patent discloses a wheel cover retention system comprising plastic caps having flanges engageable with flanges on the wheel cover. The plastic caps are threaded over external threaded lugs to secure the wheel cover to the wheel.

Another example is illustrated in U.S. Pat. No. 5,181,767 issued Jan. 26, 1993 in the name of Hudgins et al, and owned by a common company of the subject invention. The patent discloses a retention arrangement for a wheel cover mounted on a lug of a vehicle wheel. A retainer nut is positioned and threaded onto the lug by engaging internal threads of the retainer nut with the lug. The threaded portion of the retainer nut includes expansion slots formed therein to allow circumferential flexibility of the retainer nut.

It has also been known to place a metallic cover over a simple threaded retainer nut for aesthetic purposes. However, problems with these cover designs is that the internal threads may be stripped during tightening of the retainer nut.

SUMMARY OF THE INVENTION

The invention includes a wheel ornament assembly for placement on a vehicle wheel. The assembly includes a wheel ornament, a lug opening disposed through the wheel ornament for receiving a projecting threaded lug nut from a vehicle wheel, and a nut cap assembly having an insert member and a cap cover. The insert member includes a generally tubular body establishing an internal bore centered over the lug opening with a lower body portion, an upper body portion, and a flange disposed about said lower body portion and engaging the wheel ornament. The lower body portion includes an internal threaded portion disposed within the bore portion for threadably engaging the lug nut to retain the wheel ornament over the vehicle wheel. A relief slot extends into the lower body portion and internal threaded portion to permit circumferential flexibility of the insert member in the area of the internal threads. The cap cover extends over the upper body portion and the lower body portion and is fixedly secured to the insert member while allowing the circumferential flexibility of the insert member at the internal threaded portion.

The invention also includes a nut cap assembly for engaging and covering a threaded lug of a vehicle wheel. The nut cap assembly includes an insert member and a cap cover. The insert member includes a generally tubular body establishing an internal bore centered over the lug opening with a lower body portion, an upper body portion, and a flange disposed about the lower body portion and engaging the wheel ornament. The lower body portion includes an internal threaded portion disposed within the bore portion for threadably engaging the lug nut to retain the wheel ornament over the vehicle wheel. A relief slot extends into the lower body portion at the internal threaded portion to permit circumferential flexibility of the insert member in the area of the internal threads. The cap cover extends over the upper body portion and the lower body portion and is fixedly secured to the insert member while allowing the circumferential flexibility of the insert member at the internal threaded portion.

The invention allows a decorative cap cover to be secured over the insert member while allowing the insert member to flex or expand to prevent stripping of the threads.

Other features and advantages of the present invention will be readily appreciated as the same becomes better understood after reading the subsequent description when considered in connection with the accompanying drawings.

BRIEF DESCRIPTION OF THE DRAWINGS

FIG. 2 is and exploded view of the nut cap assembly comprising the insert member and cap cover;

FIG. 3 is a perspective view of the nut cap assembly;

DESCRIPTION OF THE PREFERRED EMBODIMENT(S)

Figure 1:
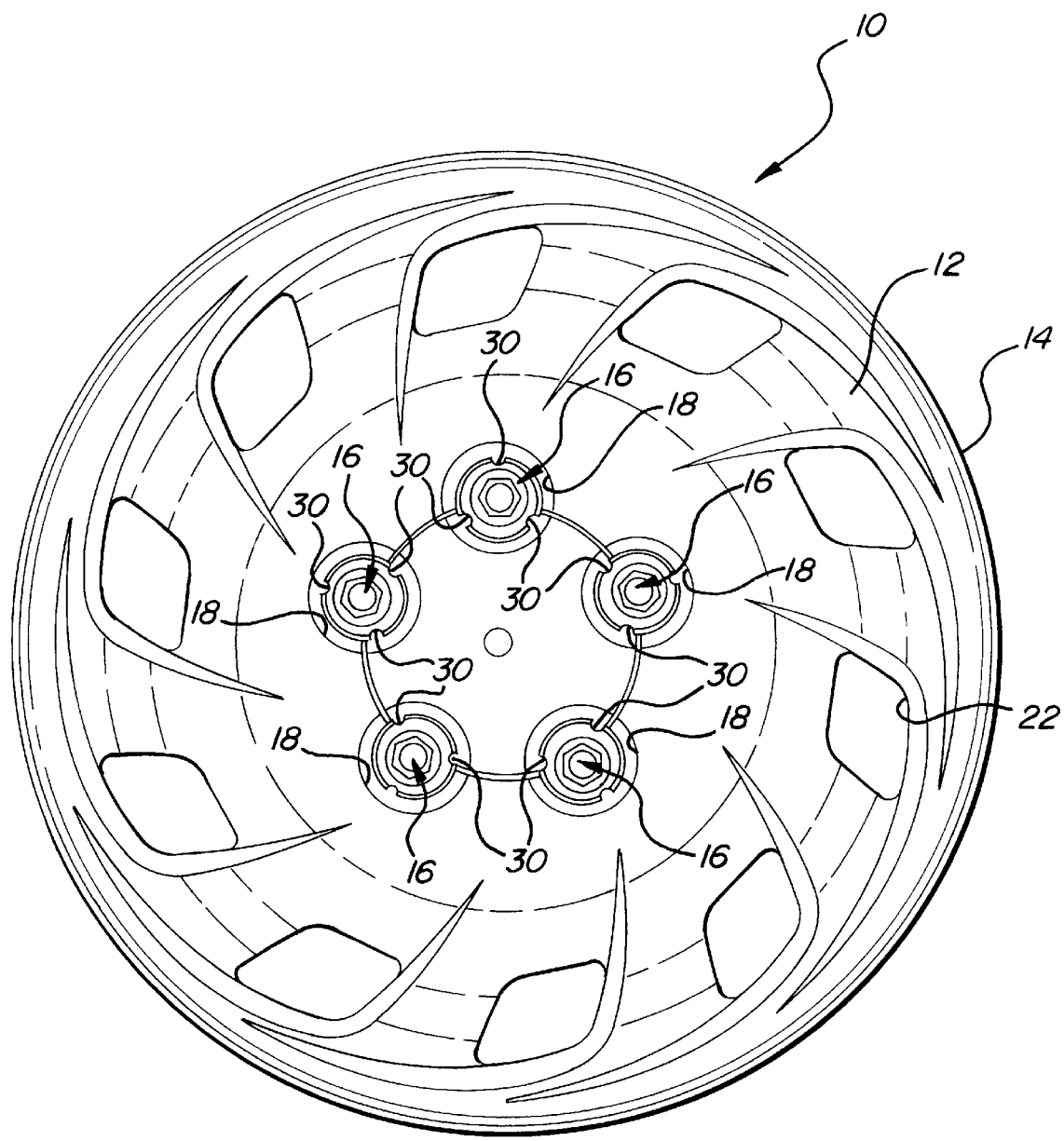
FIG. 1 is a plan view of a wheel ornament assembly comprising a wheel in accordance with the subject invention.
Figure 4:
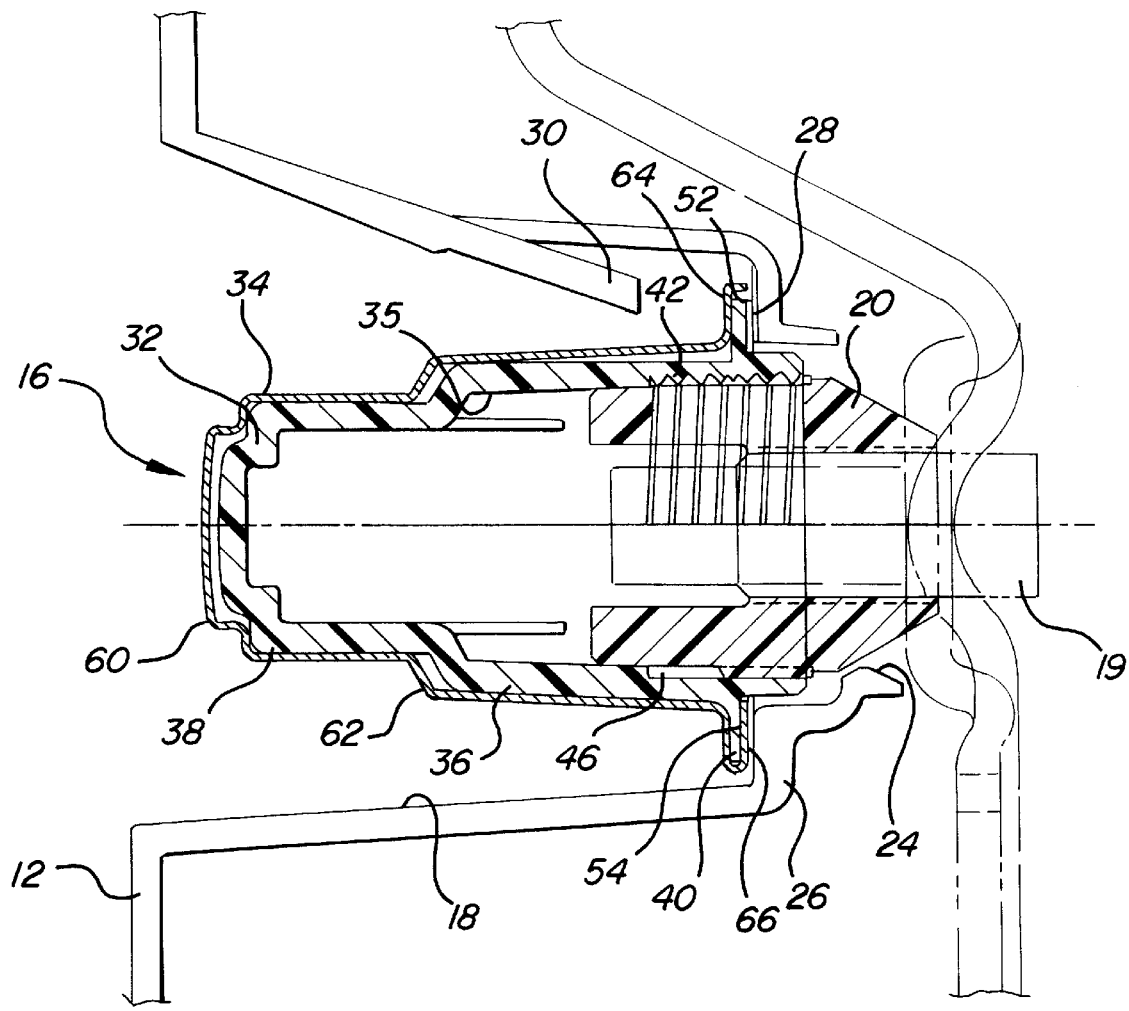
FIG. 4 is a cross-sectional view of the nut cap assembly taken along lines 4—4 of FIG. 3.
Figure 5:
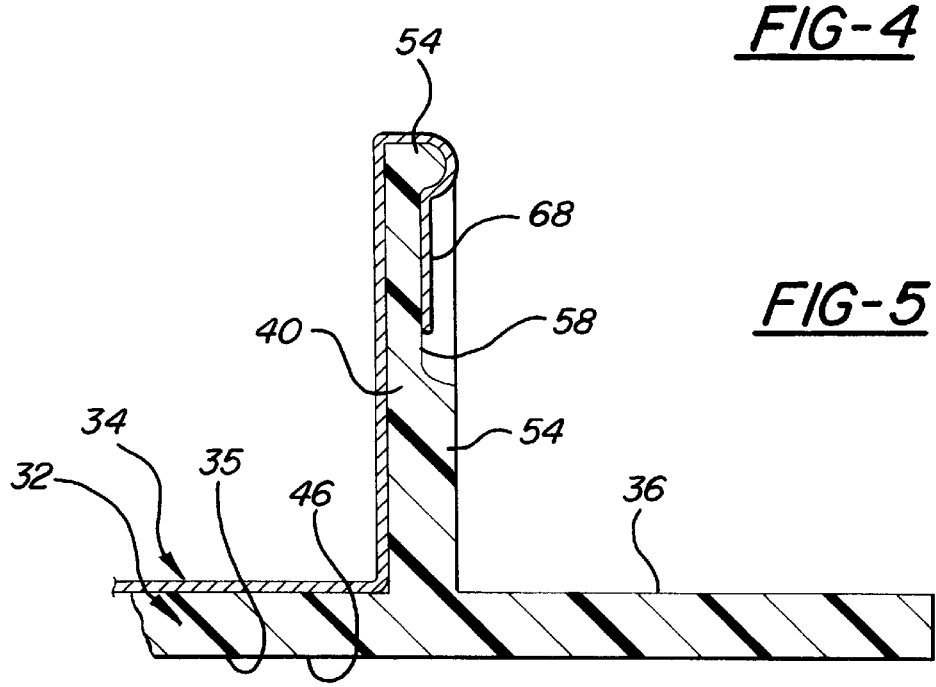
FIG. 5 is a cross-sectional view of a portion of the nut cap assembly taken along lines 5—5 of FIG. 3.
Figure 6:
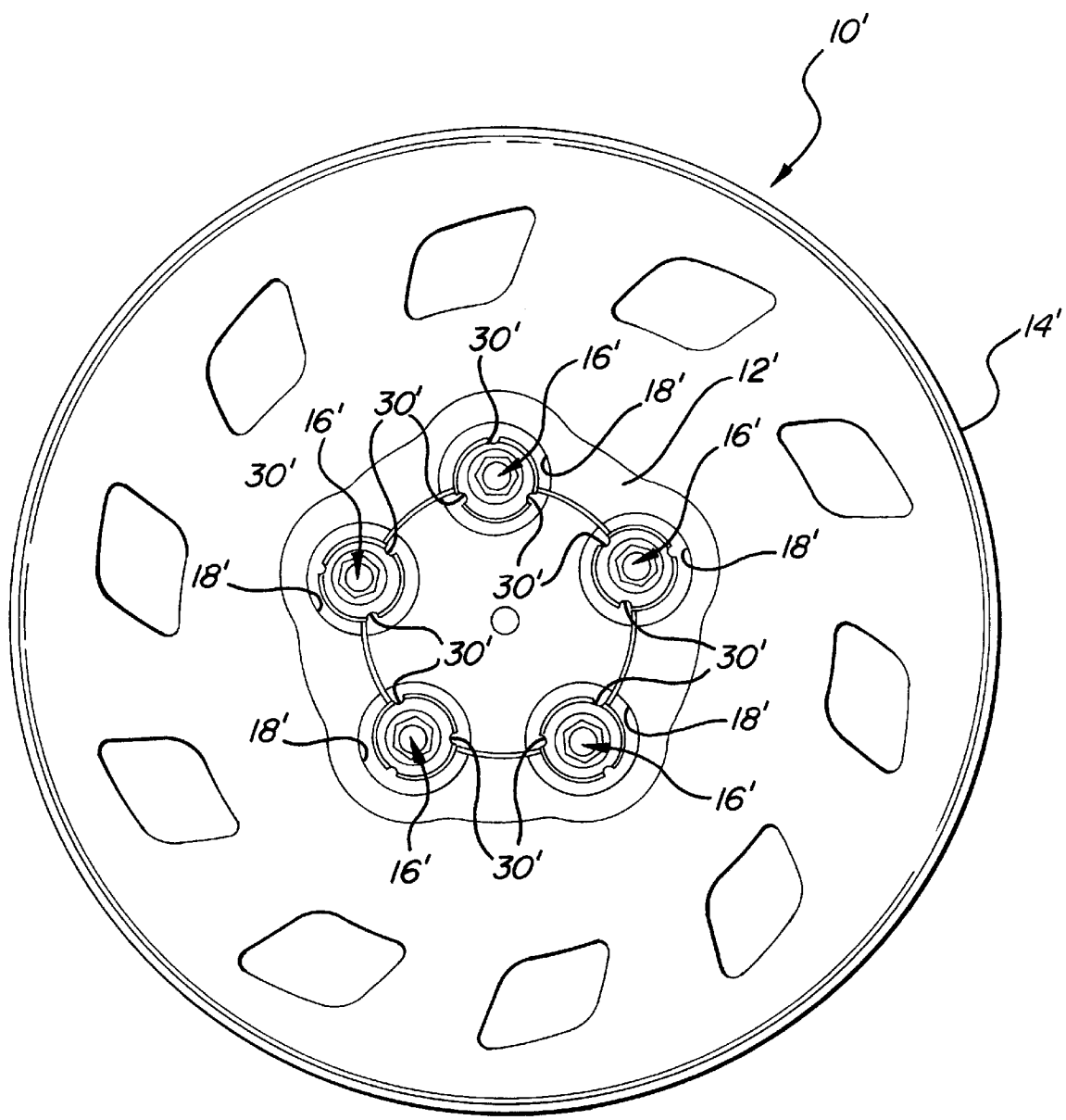
FIG. 6 is a plan view of a wheel ornament assembly comprising a hub.

A wheel ornament assembly 10 is generally illustrated in FIG. 1. The wheel ornament assembly 10 includes a wheel ornament 12 secured to a vehicle wheel 14 by a plurality of nut cap assemblies 16 which rest in corresponding wheel ornament wells 18. The wheel ornament 12 may be comprised of a wheel cover 12 as illustrated in FIG. 1 or a hub 12' as illustrated in FIG. 6. It is to be appreciated that other types of ornaments or attachments may be used. The wheel ornament wells 18 extend inwardly toward the vehicle wheel 14 at a central portion of the wheel ornament 12. The wells 18 are spaced to be in alignment with corresponding lug nuts 20 which are threaded on lug studs 19 extending outwardly from the vehicle wheel mounting hub. The lugs 20 include an internally threaded bore to receive the lug studs 19, and include external threads thereabout to receive the nut cap assemblies 16.

Also included in the wheel ornament 12 (in the case of a wheel cover) are a plurality of vent openings 22 around an outer peripheral area of the wheel ornament 12. There are various designs of wheel ornaments 12 of differing contours and decorative elements, any of which could be used with the subject invention as would be appreciated by one skilled in the art.

Each wheel ornament well 18 extends inwardly toward the vehicle wheel 14 from an outer surface of the cover 12 along a substantially frustoconical surface to an inner lug opening 24, which is surrounded by a bottom opening flange 26. The opening flange 26 carries a plurality of serrations 28 which cooperate with the nut cap assembly 16, as subsequently discussed. Such serrations are also set forth in U.S. Pat. No. 5,181,767 assigned to the assignee of the subject invention and incorporated by reference herein.

Extending from the frustoconical surface of each of the wells 18 are a plurality of protrusions 30. The protrusions 30 are positioned to trap the nut cap assembly 16 between the plurality of protrusions 30 and bottom opening flange 26 of the well 18. In this manner, whenever the nut cap assembly 16 is unscrewed from a threaded portion of the lug nut 20, the nut cap assembly 16 will remain captured in the well 18 thereby prevent displacement of the nut cap assembly 16. Such is also set forth in the referenced U.S. Pat. No. 5,181,767.

The nut cap assembly 16 is comprised of an insert member 32 and a cap cover 34. The insert member 32 includes a generally tubular body having an internal bore 35 centered over the lug opening 24 with a lower body portion 36 and upper body portion 38, and a retainer flange 40 disposed about the lower body portion 36 and engaging the wheel ornament 12. The lower body portion 36 includes an internal threaded portion 42 disposed within the bore 35 for threadably engaging the externally threaded lug nut 20 to retain the wheel ornament 12 on the vehicle wheel 14. The threaded portion 42 on the nut cap assembly 16 matingly and threadingly engages with the external threads on the lug nut 20.

Also included are a plurality of relief slots 44 extending into the lower body portion 36 of the internal threaded portion 42 to permit circumferential flexibility of the nut cap assembly 16 in the area of the internal threaded portion 42. The relief slots 44 are spaced about the circumference of the lower body portion 36 and extend axially through the thread pattern 42. The relief slots 44 serve the purpose of imparting a sufficient degree of flexibility to the nut cap assembly 16 such that upon application of a predetermined force or torque by over-tightening the nut cap assembly 16, the nut cap assembly 16 will have its lower body portion 36 yield sufficiently to prevent stripping of the threads 42 against the lug nut 20 when too much torque is applied.

The nut cap assembly 16 also includes a non-threaded surface portion 46 adjacent the slot 44 and extending in the bore 35 of the lower body portion 36 to interrupt the thread pattern 42 while allowing the thread pattern 42 to engage the lug nut 20. The non-threaded portions 46 generally provide a smooth surface so as to not engage with the threads of the lug nut 20 and not to require flexing thereof. The spaced, non-threaded surface portions 46 are separated by the relief slots 44 and by the threaded portion 42. The non-threaded portions 46 are spaced circumferentially about the lower body portion 36 and also extend axially through the threaded portion 42. In the preferred embodiment as illustrated in the Figures, the threaded portion 42 and the non-threaded portion 46 alternate in circumferential sections about the lower body portion 36, each separated by a relief slot 44. There are four threaded sections and four non-threaded sections. However, it should be appreciated that different alternating arrangements of the threaded and non-threaded portions 42, 46 are well within the teachings of the subject invention.

The non-threaded portion 46 extends a distance into the bore 35 less than the threaded portion 42 so that the thread pattern 42 engages the lug nut 20 and the non-threaded portion 46 does not engage nor interfere with the cooperating threads of the lug nut 20.

The retainer flange 40 has a lower surface 50 defined by a plurality of spaced serrated portions 52 and non-serrated portions 54 separated by the relief slot 44. The serrated portions 52 are aligned and integrally connected to the portion of the lower body portion 36 containing the threaded portion 42, whereas the non-serrated portions 54 are aligned and integrally connected to the portion of the lower body portion 36 containing the non-threaded portion 46. The serrated portions 52 extend an axial height greater than the axial height of the non-serrated portions 54 from the lower surface 50 so that the serrated portions 52 engage the serrations 28 of the wheel ornament 12 and the non-serrated portions 54 do not interfere.

The non-serrated portion 54 includes a recess or notch 58 therein for attachment with the cap cover 341 as subsequently discussed. The non-serrated portion 54 may also extend a greater radial length from the lower body portion 36 than the serrated portions 52 to allow ease in connection with the cap cover 34. The serrations 28, 52 interengage for a positive nut tightening engagement between the bottom of the nut cap assembly 16 and its corresponding wheel ornament well 18.

The cap cover 34 extends over the upper body portion 38 and the lower body portion 36 and retainer flange 40 on the externally exposed surfaces thereof. The cap cover 34 is fixedly secured to the insert member 32 while allowing the circumferential flexibility of the insert member 32 at the internal threaded portion 42.

The cap cover 34 includes an upper cover portion 60 and a lower cover portion 62 with a flange cover portion 64 extending from the bottom of the lower cover portion 62. The cover flange portion 64 includes an axial lip 66 extending over and engaging the retainer flange 40 of the insert member 32 to fixedly secure the cap cover 34 to the insert member 32. The lip 66 engages the non-serrated portion 54 of the retainer flange 40 to fixedly secure the insert member 32 and the cap cover 34 without interfering with the ratcheting effect by the serrated portion 52. In the preferred embodiment, the cap cover 34 includes tabs 68 extending from the lip 66 and aligned with the non-serrated portions 54 so that such tabs 68 may be bent over onto the non-serrated portion 54 and pressed within the recesses or notches 58 therein. This will prevent rotation of the insert member 32 with respect to the cap cover 34. In the preferred embodiment, four such tabs 68 are provided. However, it can be appreciated that any number may be utilized to prevent the rotation.

The lower body portion 36 forming the thread pattern 42 is spaced from the wall of the lower cover portion 62 of the cap cover 34 to allow flexing of the lower body portion 36 of the insert member 32 to prevent stripping of the threads by disengagement of the threads.

The insert member 32 and cap cover 34 have their respective upper body portions 38, 60 providing a hex nut receiving head to allow the nut cap assembly 16 to be tightened using a standard socket wrench. The upper cover portion 60 and upper body portion 38 are of similar shape and of dimension to allow the insert member 32 to fit within the cap cover 34 but aid in prevention of relative rotation between the two by being of similar hex shape.

Typically, the cap cover 34 is of a material different from the insert member 32 to provide the necessary aesthetics along with structural and functional performance. In a preferred embodiment, the cap cover 34 is made of a thin metal material of substantially uniform thickness. The insert member 32 is made of a plastic material integrally molded and/or cut. The insert member 32 is of structural rigidity to retain the wheel ornament 12. The cap cover 34 may be stainless steel such as with a polished finish, or may be chrome plated or otherwise finished as known in the art.

FIG. 6 illustrates the wheel ornament 12' as a hub. The above teachings of the nut cap assembly 16 may be used with the hub 12', wherein common reference numerals (primed) indicate common parts.

It should also be appreciated that other threaded members may be used instead of the lug nut 20 for securing a wheel ornament 12 to a wheel 14.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A wheel ornament assembly for placement on a vehicular wheel including a projecting externally threaded lug nut, said assembly comprising:

a wheel ornament;

a lug opening disposed through said wheel ornament for receiving the projecting externally threaded lug nut from the vehicular wheel;

a nut cap assembly including an insert member and a cap cover, said cap cover fixedly secured to said insert member to prevent rotation between said cap cover and said insert member;

said insert member including a generally tubular body with a bore therein and centered over the projecting externally threaded lug nut opening with a lower body portion, an upper body portion, and a retainer flange disposed about said lower body portion and engaging said wheel ornament;

said lower body portion including an internal threaded portion disposed within said bore for threadably engaging the lug nut to retain said wheel ornament on the vehicular wheel;

a relief slot extending into said lower body portion to permit circumferential flexibility of said insert member in the area of said internal threaded portion, said cap cover extending over said upper body portion and fixedly secured to said insert member allowing the circumferential flexibility of said insert member at said internal threaded portion.

2. An assembly as set forth in claim 1 further including a non-threaded portion circumferentially spaced from and interrupting said internal threaded portion and extending in said bore while allowing said internal threaded portion to engage the projecting externally threaded lug nut.

3. An assembly as set forth in claim 2 further including a plurality of spaced non-threaded portions and threaded portions extending and alternating about the circumference of said bore.

4. An assembly as set forth in claim 2 further including a plurality of relief slots between said non-threaded portions and said internal threaded portions.

5. An assembly as set forth in claim 4 wherein said retainer flange extends outwardly from said lower body portion with said relief slots extending therethrough.

6. An assembly as set forth in claim 5 wherein said retainer flange includes a bottom surface, said lower body portion and internal threaded portion extending a predetermined axial distance beyond said bottom surface of said retainer flange.

7. An assembly as set forth in claim 6 further including a plurality of serrations disposed about said bottom surface of said retainer flange and a corresponding plurality of mating serrations disposed on said wheel ornament about said lug opening.

8. An assembly as set forth in claim 5 wherein said cap cover includes an upper portion and lower portion with a flange cover portion extending from said lower portion.

9. An assembly as set forth in claim 8 wherein said flange cover portion includes a lip extending over and engaging said retainer flange of said insert member to fixedly secure said cap cover to said insert member.

10. An assembly as set forth in claim 9 wherein said retainer flange is defined by a plurality of serrated portions and non-serrated portions separated by said relief slots, said lip engaging said non-serrated portions of said retainer flange to fixedly secured said insert member to said cap cover.

11. An assembly as set forth in claim 10 wherein said serrated portion extends for an axial height greater than the axial height of said non-serrated portion and said lip.

12. An assembly as set forth in claim 11 wherein said lip includes a plurality of tabs extending therefrom to fold over and clamp onto said non-serrated portions.

13. An assembly as set forth in claim 12 wherein said non-serrated portions include a recess for receiving said tabs therein to prevent relative rotation between said insert member and said cap cover.

14. An assembly as set forth in claim 9 wherein said lip includes a plurality of tabs extending therefrom to fold over and clamp onto said bottom surface of said retainer flange.

15. An assembly as set forth in claim 14 wherein said bottom surface of said retainer flange include a recess for receiving said tabs therein to prevent relative rotation between said insert member and said cap cover.

16. A nut cap assembly for engaging and covering a threaded lug nut of a vehicular wheel, said nut cap assembly comprising:

an insert member;

a cap cover over said insert member such that said cap cover rotates with said insert member with no lost motion therebetween;

said insert member including a generally tubular body with a bore therein and centered over the lug opening with a lower body portion, an upper body portion, and a retainer flange disposed about said lower body portion and engaging said wheel ornament;

said lower body portion including an internal threaded portion disposed within said bore for threadably engaging the lug nut to retain said wheel ornament on the vehicular wheel;

a relief slot extending into said internal threaded portion to permit circumferential flexibility of said insert member in the area of said internal threaded portion, said cap cover extending over said upper body portion and fixedly secured to said insert member allowing the circumferential flexibility of said insert member at said internal threaded portion.

17. As assembly as set forth in claim 16 further including a non-threaded portion circumferentially spaced from and interrupting said internal threaded portion and extending in said bore while allowing said internal threaded portion to engage said lug nut.

18. An assembly as set forth in claim 17 further including a plurality of spaced non-threaded portions and threaded portion extending and alternating about the circumference of said bore.

19. An assembly as set forth in claim 18 further including a plurality of relief slots between said non-threaded portions and said internal threaded portions.

20. An assembly as set forth in claim 19 wherein said retainer flange extends outwardly from said lower body portion with said relief slots extending therethrough.

21. An assembly as set forth in claim 20 wherein said cap cover includes an upper portion and lower portion with a flange cover portion extending from said lower portion.

22. An assembly as set forth in claim 21 wherein said flange cover portion includes a lip extending over and engaging said retainer flange of said insert member to fixedly secure said cap cover to said insert member.

23. An assembly as set forth in claim 22 wherein said lip includes a plurality of tabs extending therefrom to fold over and clamp onto said bottom surface of said retainer flange.

24. An assembly as set forth in claim 23 wherein said bottom surface of said retainer flange include a recess for receiving said tabs therein to prevent relative rotation between said insert member and said cap cover.

25. A wheel ornament assembly for placement on a vehicular wheel, said assembly comprising:

a wheel ornament;

a lug opening disposed through said wheel ornament for receiving a projecting externally threaded lug nut from a vehicular wheel;

a nut cap assembly including an insert member and a cap cover;

said insert member including a generally tubular body with a bore therein and centered over said lug nut opening with a lower body portion, an upper body portion, and a retainer flange disposed about said lower body portion and engaging said wheel ornament;

said lower body portion including an internal threaded portion disposed within said bore for threadably engaging the lug nut to retain said wheel ornament on the vehicular wheel;

a relief slot extending into said lower body portion to permit circumferential flexibility of said insert member in the area of said internal threaded portion, said cap cover extending over said upper body portion and fixedly secured to said insert member allowing the circumferential flexibility of said insert member at said internal threaded portion;

said cap cover including an upper portion and lower portion with a flange cover portion extending from said lower portion, said flange cover portion including a lip extending over and engaging said retainer flange of said insert member to fixedly secure said cap cover to said insert member, said lip including a plurality of tabs extending therefrom to fold over and clamp onto said bottom surface of said retainer flange.

26. An assembly as set forth in claim 25 wherein said bottom surface of said retainer flange include a recess for receiving said tabs therein to prevent relative rotation between said insert member and said cap cover.

27. A cap assembly for securing a wheel ornament on a vehicular wheel by a threaded member, said assembly comprising:

an insert member including a generally tubular body with a bore therein with a lower body portion, an upper body portion, and a retainer flange disposed about said lower body portion and engaging the wheel ornament;

said lower body portion including an internal threaded portion disposed within said bore for engaging the threaded member to retain the wheel ornament on the vehicular wheel;

a relief slot extending into said lower body portion to permit circumferential flexibility of said insert member in the area of said internal threaded portion; and a cap cover extending over and covering all of said upper body portion and said lower body portion of said insert member.

28. An assembly as set forth in claim 27 further including a non-threaded portion circumferentially spaced from and interrupting said internal threaded portion and extending in said bore while allowing said internal threaded portion to engage the projecting externally threaded lug nut.

29. A cap assembly for securing a wheel ornament on a vehicular wheel by a threaded member, said assembly comprising:

a generally tubular body with a bore therein, said generally tubular body including a lower body portion, an upper body portion and a retainer flange disposed about said lower body portion to engage the wheel ornament, said lower body portion including an internal threaded portion disposed within said bore for engaging the threaded member to retain the wheel ornament on the vehicular wheel, a relief slot extending into said lower body portion to permit circumferential flexibility of said insert member in the area of said internal threaded portion, and a non-threaded portion circumferentially spaced from and interrupting said internal threaded portion and extending in said bore while allowing said internal threaded portion to engage the threaded member.

30. An assembly as set forth in claim 29 wherein said non-threaded portion extends into said bore a distance less than said internal threaded portion.

* * * * *

UNITED STATES PATENT AND TRADEMARK OFFICE
CERTIFICATE OF CORRECTION

PATENT NO.   : 5,842,749
DATED        : December 1, 1998
INVENTOR(S)  : Robert J. DiMarco It is certified that error appears in the above-identified patent and that said Letters Patent is hereby corrected as shown below:

Column 4, line 13, please delete "341" and insert therefor --34,--.

Signed and Sealed this

Fourth Day of May, 1999

Attest:

Attesting Officer

Q. TODD DICKINSON

Acting Commissioner of Patents and Trademarks